United States Patent Office 2,809,123
Patented Oct. 8, 1957

2,809,123

FIBROUS SYNTHETIC MATERIAL OF IMPROVED WHITENESS

Ernst Keller, Binningen, Basel Land, and Reinhard Zweidler, Basel, Switzerland, assignors to J. R. Geigy A.-G., Basel, Switzerland, a Swiss firm No Drawing. Application February 20, 1956,
Serial No. 566,364

Claims priority, application Switzerland March 4, 1955

6 Claims. (Cl. 117—33.5)

The invention concerns a process for the improvement of the appearance of synthetic substances which consist of or contain polymeric or copolymeric acrylonitrile, in particular in the form of undyed textile fibres and goods made up therefrom. It also concerns, as industrial product, polyacrylonitrile fibres, the appearance of which has been improved, which are distinguished by a slight content of violet-blue to green-blue fluorescent substances of the monomethine cyanine series.

It is known that the dyeing behaviour of textile fibres from polyacrylonitrile and copolymers which to a great extent are obtained from acrylonitrile, differs characteristically from that of the usual textile fibres. This means that the usual water soluble brightening agents, the optical effect of which is due to a violet-blue to green-blue fluorescence on the substrata brought out by the ultraviolet light in daylight and the water solubility of which is due to acid, salt-forming substituents, are not suitable for the brightening of this particular type of fibre because they lack affinity.

It has now been found that the appearance in daylight of synthetic materials which consist of or contain polymeric or copolymeric acrylonitrile, in particular in the form of undyed textile fibres and goods made up therefrom can be very effectively improved if they are treated with a slight amount of a compound of the general formula:

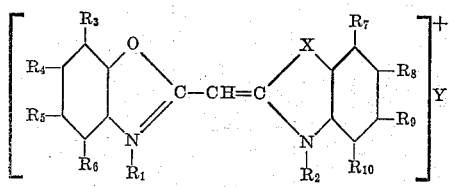

or the tautomeric forms thereof. In this formula:

$R_1$ and $R_2$ represent alkyl groups having advantageously 1 to 4 carbon atoms $R_3$ to $R_{10}$ each represent hydrogen or a non-ionogenic and non-chromophoric substituent, X represents sulphur or a geminately bound hydrocarbon radical, and Y represents the equivalent of an inorganic or organic acid For example, neither nitro groups nor salt-forming groups such as, for example sulphonic acid, carboxyl, hydroxyl or amino groups can be used as substituents in the benzene rings corresponding to $R_3$ to $R_{10}$. Often alkyl substituents, preferably methyl groups are advantageous; however, also ethyl, isopropyl, tert. butyl, tert. amyl groups and also benzyl or phenyl groups can be used. Also halogens are admissible substituents, for example fluorine or chlorine, possibly also bromine; iodine is less favourable. Ether groups, for example methoxy or ethoxy groups cause a string shifting of the fluorescent light towards green-blue; they also cause a strengthened self-colour and many of them should, therefore not be present. Also benzyloxy, phenyloxy, alkyl sulphonyl, aryl sulphonyl, cyano, acylamino, acyloxy, acid ester and acid amide groups may possibly be ring substituents, generally however, with no particular advantage. The position of these substituents in the benzene ring often has an influence on the intensity and the colour of the fluorescence light. The choice of the type and position of the substituents depends on the desired optical effect as well as on the availability of the starting materials. In the monomethine cyanine compounds used according to the present invention, unsubstituted, methyl substituted or chlorine substituted benzene rings are preferred, each benzene ring having at most 3 and advantageously nil to 2 substituents.

Chiefly divalent sulphur is used as ring member X due, firstly to the favourable shade of the fluorescence light of the monomethine cyanines and secondly to the easily accessible starting materials to obtain the said monomethine cyanines usable according to this invention. Also compounds wherein X represents a geminately bound hydrocarbon radical, in particular a dialkyl methylene group and, preferably, the dimethyl methylene group are favourable with regard to the shade of the fluorescence light and the fastness to light of the brightened material.

The radicals or the equivalents of colourless, strong organic or inorganic acids can be used as salt-forming anion Y, for example the anions of halogen hydracids, of sulphuric acid, sulphuric acid half esters, of benzene or toluene sulphonic acids.

Some of the monomethine cyanines in which X is asymmetric usable according to the present invention are known and can be produced by methods known per se by condensing an o-methyl-N-alkyl cycloammonium salt, the components being chosen suitably, with an o-alkyl-mercapto-N-alkyl cycloammonium salt while splitting off alkyl mercaptan. Thus, for example, N-alkyl-2-methyl benzoxazolium salts, possibly substituted according to the definition in the benzene ring, can be condensed in the presence of alkylating agents such as dimethyl sulphate or diethyl sulphate, with 2-methylmercapto benzthiazoles whereupon the corresponding benzoxazolo-benzthiazolo-monomethine cyanines are obtained. Also 2-methylmercapto benzoxazoles can be condensed in the presence of alkylating agents with 2-methyl-N-alkyl benzthiazolium salts or with 2-methyl indolenines to form the corresponding monomethine cyanines.

As cycloammonium salts of strong acids, the unsymmetrical monomethine cyanines usable according to the present invention are soluble in water. Due to their good affinity to polyacrylonitrile fibres they can be drawn on to the fibres like dyestuffs from an aqueous, advantageously weakly acid liquor in the warm, possibly under pressure, at temperatures of over 100° C. In contents of, for example, 0.001 to 0.2% calculated on the weight of the fibre, they lend to fibres treated therewith a bluish-white, pure white to greenish-white appearance in daylight according to the composition. The pure white, bluish- to greenish-white appearance which they lend to polyacrylonitrile fibres makes them superior to the bis-benzoxazolo monomethine cyanines which have already been suggested for similar purposes, which lend fibres treated therewith an undesirable reddish-white aspect.

The following examples serve to illustrate the subject of the invention. They have not a limiting effect. Where not otherwise stated, parts are given as parts by weight. The temperatures are in degrees centigrade. The relationship of parts by weight to parts by volume is as that of kilogrammes to litres.

*Example 1*

20 parts of polyacrylonitrile yarn ("Orlon," type 42, Du Pont, Wilmington, Delaware) are entered at 50° into a liquor containing 0.006 part of (3-methyl-benzthiazolo)-(3-methyl-benzoxazolo)-monomethine cyanine-p-toluene sulphonate (i. e. $R_1$ and $R_2$ of the general formula=$CH_3$; $R_3$ to $R_{10}$=H) and 0.6 part of 80% acetic acid in 1000 parts of water. The temperature is raised to 97–100° within 15 minutes and the liquor is kept for 30 minutes at this temperature. The yarn is washed first with lukewarm and then with cold water and dried. The material so treated has a beautiful bluish-white shading in daylight.

A similar, somewhat more greenish-white shading is obtained if in the above example, the monomethine cyanine named is replaced by 0.006 part of (3-methyl-benzthiazolo) - (3.5-dimethyl-benzoxazolo) - monomethine cyanine-p-toluene sulphonate, (i. e. $R_1$ and $R_2$ of the general formula=$CH_3$, $R_5$=$CH_3$, $R_{3,4,6-10}$=H).

The (3-methyl-benzthiazolo) - (3-methyl- or -3.5-dimethyl-benzoxazolo) - monomethine cyanine-p-toluene sulphonate is obtained according to the method of British Patent No. 424,559 by quaternising at a temperature of 120–130°, 14.9 parts of 2-methyl-benzthiazole with 18.6 parts of p-toluene sulphonic acid methyl ester and condensing with the addition of 16.5 parts of 2-methylmercapto-benzoxazole or 17.9 parts of 2-methylmercapto-5-methyl-benzoxazole and 18.6 parts of p-toluene sulphonic acid methyl ester for several hours at 140–150°, methyl mercaptan being split off. The same compound is obtained if 13.3 parts of 2-methyl-benzoxazole or 14.7 parts of 2.5-dimethyl - benzoxazole are first quaternised with 18.6 parts of p-toluene sulphonic acid methyl ester and then condensed with 18.1 parts of 2-methylmercapto-benzthiazole and 18.6 parts of p-toluene sulphonic acid methyl ester.

*Example 2*

20 parts of polyacrylonitrile yarn ("Orlon," type 42, Du Pont, Wilmington, Delaware) are entered at 50° into a liquor which contains 0.004 part of (1.3.3-trimethyl-indolo) - (3-methyl-benzoxazolo) - monomethine cyanine acetate

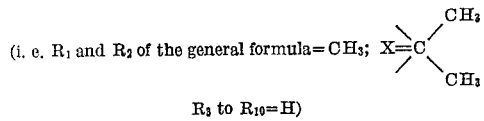

(i. e. $R_1$ and $R_2$ of the general formula=$CH_3$; $R_3$ to $R_{10}$=H)

and 0.6 part of 80% acetic acid in 1000 parts of water. The temperature is raised to 97–100° within 15 minutes and the liquor is kept for 30 minutes at this temperature. The hank is then washed with cold water and dried. The yarn so obtained has a beautiful blue-greenish white shading in daylight.

A similar, somewhat more greenish-white shading is obtained if in the above example, the monomethine cyanine named is replaced by 0.002 part of (1.3.3-trimethyl-indolo) - (3.5-dimethyl-benzoxazolo) - monomethine cyanine acetate

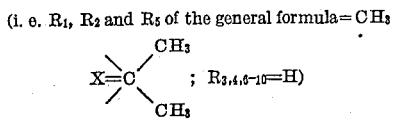

(i. e. $R_1$, $R_2$ and $R_5$ of the general formula=$CH_3$; $R_{3,4,6-10}$=H)

The (1.3.3-trimethyl-indolo) - (3-methyl- or 3.5-dimethyl-benzoxazolo)-monomethine cyanine acetate is obtained according to the method of British Patent No. 424,559 by quaternising at a temperature of 120–125°, 14.9 parts of 2-methylmercapto-benzoxazole or 17.9 parts of 2-methylmercapto-5-methyl-benzoxazole with 18.6 parts of p-toluene sulphonic acid methyl ester and condensing for several hours at a temperature of 150–155° with the addition of 15.9 parts of 2.3.3-trimethyl-indolenine or 17.3 parts of 1.3.3-trimethyl-2-methylene indole and 18.6 parts of p-toluene sulphonic acid methyl ester while splitting off methyl mercaptan. The monomethine cyanine is obtained as a yellowish powder on recrystallising from aqueous acetic acid.

*Example 3*

20 parts of polyacrylonitrile yarn ("Orlon," type 81 Du Pont, Wilmington, Delaware), are entered into a liquor in a pressure apparatus which contains 0.01 part of the (3 - methyl - benzthiazolo) - (3-methyl - benzoxazolo)-monomethine cyanine-p-toluene sulphonate named in Example 1 and 0.6 part of 80% acetic acid in 1000 parts of water. The temperature is kept for 30 minutes at 120° and then the yarn is washed first with lukewarm and then with cold water and dried. The material so treated has a beautiful, bluish-white shading in daylight.

The following table contains further monomethine cyanines which can be used as described in Examples 1 to 3, which correspond to the general formula:

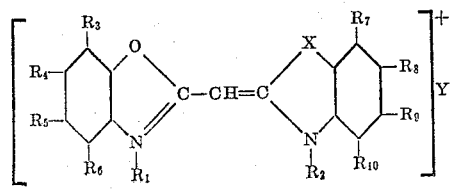

TABLE

| No. | $R_1$ | $R_2$ | $R_{3-10}$ different from H | X | Anion Y | optical effect on "Orlon" |
|---|---|---|---|---|---|---|
| 1 | $CH_3$ | $CH_3$ | $R_5 = -Cl$ | S | p-toluene-$SO_3'$ | greenish-blue white. |
| 2 | $C_2H_5$ | $C_2H_5$ | | S | benzene-$SO_3'$ | greenish-white. |
| 3 | $C_3H_7$ | $C_3H_7$ | | S | p-toluene-$SO_3'$ | bluish-white. |
| 4 | $CH_3$ | $CH_3$ | $R_3$ and $R_5 = -CH_3$ | S | benzene-$SO_3'$ | id. |
| 5 | $CH_3$ | $CH_3$ | | S | $\frac{SO_4''}{2}$ | id. |
| 6 | $C_3H_7$ | $C_3H_7$ | $R_5 = -CH_3$ | S | p-toluene-$SO_3'$ | bluish-green white. |
| 7 | $CH_3$ | $CH_3$ | $R_5 = -\langle\bigcirc\rangle$ | S | id | id. |
| 8 | $CH_3$ | $CH_3$ | $R_5 = -SO_2NH_2$ | S | id | id. |
| 9 | $CH_3$ | $CH_3$ | $R_5 = -SO_2N(CH_3)_2$ | S | id | id. |
| 10 | $CH_3$ | $CH_3$ | $R_5 = -SO_2CH_3$ | S | id | id. |
| 11 | $CH_3$ | $CH_3$ | $R_5 = -OCH_3$ | S | id | greenish-white. |
| 12 | $CH_3$ | $CH_3$ | $R_8 = -Cl$ | S | id | greenish-blue white. |
| 13 | $CH_3$ | $CH_3$ | $R_5 = -CH_3$; $R_8 = -Cl$ | S | p-toluene-$SO_3'$ | greenish-blue white. |
| 14 | $CH_3$ | $CH_3$ | $R_8 = -CH_3$ | S | id | id. |
| 15 | $CH_3$ | $CH_3$ | $R_5$ and $R_8 = -CH_3$ | S | id | greenish-white. |
| 16 | $CH_3$ | $CH_3$ | $R_5 = -OCH_3$ | $=C(CH_3)_2$ | id | id. |
| 17 | $CH_3$ | $CH_3$ | $R_5 = -\langle\bigcirc\rangle$ | id. | id | id. |
| 18 | $CH_3$ | $CH_3$ | $R_5 = -SO_2NH_2$ | id. | id | id. |
| 19 | $CH_3$ | $CH_3$ | $R_5 = -SO_2N(CH_3)_2$ | id. | id | id. |
| 20 | $CH_3$ | $CH_3$ | $R_5 = -SO_2CH_3$ | id. | id | id. |
| 21 | $CH_3$ | $CH_3$ | $R_8 = -Cl$ | id. | id | id. |
| 22 | $CH_3$ | $CH_3$ | $R_5 = -CH_3$; $R_8 = -Cl$ | id. | id | id. |

What we claim is:

1. Polyacrylonitrile fibres having adsorbed thereinto a very small quantity of a compound of the general formula:

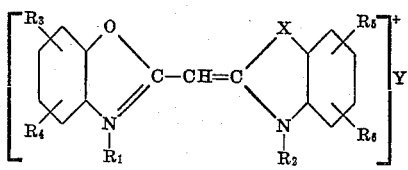

wherein
$R_1$ and $R_2$ represent low molecular alkyl radicals
$R_3$ to $R_6$ are selected from the class consisting of hydrogen, halogen, alkyl, alkoxy, mononuclear aryl, sulphonamide and alkyl sulphone groups
X represents a member selected from the group consisting of S and

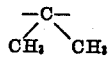

Y is an acid radical.

2. Polyacrylonitrile fibres having adsorbed thereinto a very small quantity of (3-methyl-benzthiazolo)-(3-methyl-benzoxazolo)-monomethine cyanine-p-toluene sulphonate.

3. Polyacrylonitrile fibres having adsorbed thereinto a very small quantity of (3-methyl-benzthiazolo)-(3.5-dimethyl-benzoxazolo)-monomethine cyanine-p-toluene sulphonate.

4. Polyacrylonitrile fibres having adsorbed thereinto a very small quantity of (1.3.3-trimethyl-indolo)-(3-methyl-benzoxazolo)-monomethine cyanine acetate.

5. Polyacrylonitrile fibres having adsorbed thereinto a very small quantity of (1.3.3-trimethyl-indolo)-(3.5-dimethyl-benzoxazolo)-monomethine cyanine acetate.

6. Polyacrylonitrile fibres having adsorbed thereinto a very small quantity of (3-methyl-benzthiazolo)-(3-methyl-5-phenyl-benzoxazolo)-monomethine cyanine-p-toluene sulphonate.

References Cited in the file of this patent

UNITED STATES PATENTS 2,620,282    Fry et al. _____ Dec. 2, 1952